US 6,665,390 B1

(12) United States Patent
Ekstrom

(10) Patent No.: US 6,665,390 B1
(45) Date of Patent: *Dec. 16, 2003

(54) SERVICES NODE ROUTING SERVICE

(75) Inventor: Gayle R. Ekstrom, Chicago, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,999

(22) Filed: May 15, 2000

Related U.S. Application Data

(63) Continuation of application No. 08/997,081, filed on Dec. 23, 1997, now Pat. No. 6,134,311.

(51) Int. Cl.[7] .................................................. H04M 3/00
(52) U.S. Cl. ........................ 379/201.01; 379/211.02; 379/229; 379/230; 379/207.02; 379/219; 379/220.01
(58) Field of Search .................. 37/201, 207, 211, 37/219, 220, 221, 229, 230

(56) References Cited

U.S. PATENT DOCUMENTS

| 5,289,528 A | 2/1994 | Ueno et al. |
| 5,329,578 A | 7/1994 | Brennan et al. |
| 5,392,342 A | 2/1995 | Rosenthal |
| 5,448,627 A | 9/1995 | Ueno et al. |
| 5,548,636 A | 8/1996 | Banniser et al. |
| 5,553,129 A | 9/1996 | Partridge, III |
| 5,566,235 A | 10/1996 | Hetz |
| 5,586,169 A | 12/1996 | Pinard et al. |
| 5,592,541 A | 1/1997 | Fleischer, III et al. |
| 5,598,464 A | 1/1997 | Hess et al. |
| 5,602,909 A | 2/1997 | Carkner et al. |
| 5,625,681 A | 4/1997 | Butler, II |
| 5,642,410 A | 6/1997 | Walsh et al. |
| 5,883,950 A | 3/1999 | Sonnenberg |
| 5,892,821 A | 4/1999 | Turner |
| 5,910,981 A | 6/1999 | Bhagat et al. |

OTHER PUBLICATIONS

The Advanced Intelligent Network by Gayle Ekstrom; Midwest Engineer; Mar./Apr. 1995.

Primary Examiner—William J. Deane, Jr.
(74) Attorney, Agent, or Firm—Brinks Hofer Gilson & Lione

(57) ABSTRACT

A method and system for treating telephone calls at a services node prior to completing the telephone call. The services node may provide a variety of services to treat the telephone call such as a Personal Access Service or playing a pre-recorded message. After treatment at the services node, the system recognizes that the telephone call has already been treated at a services node and the call is completed.

28 Claims, 3 Drawing Sheets

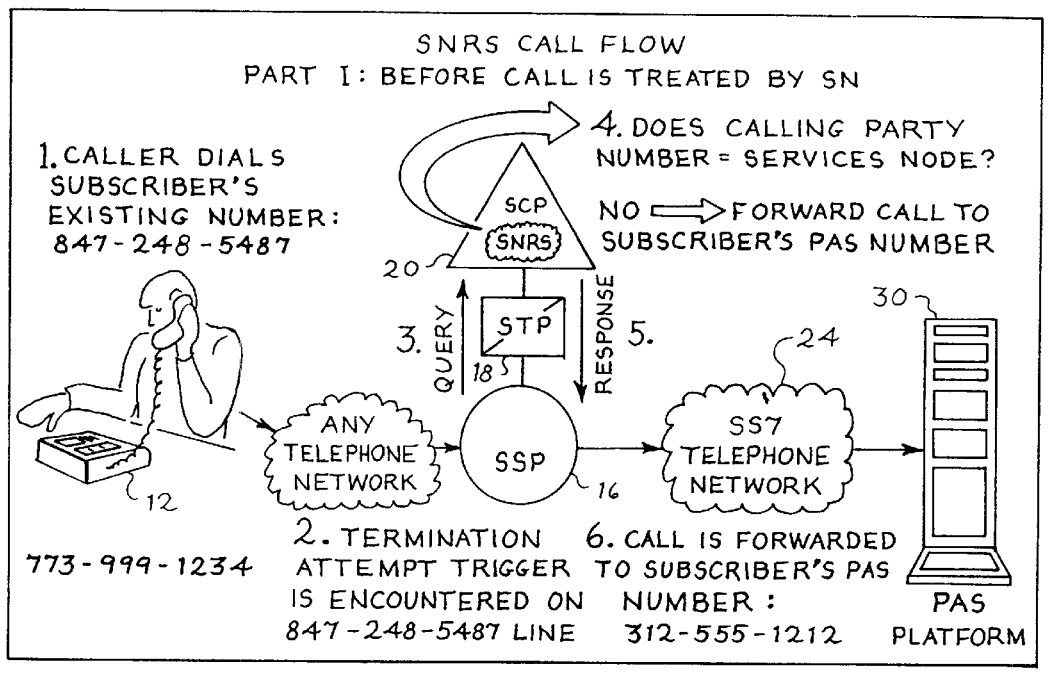
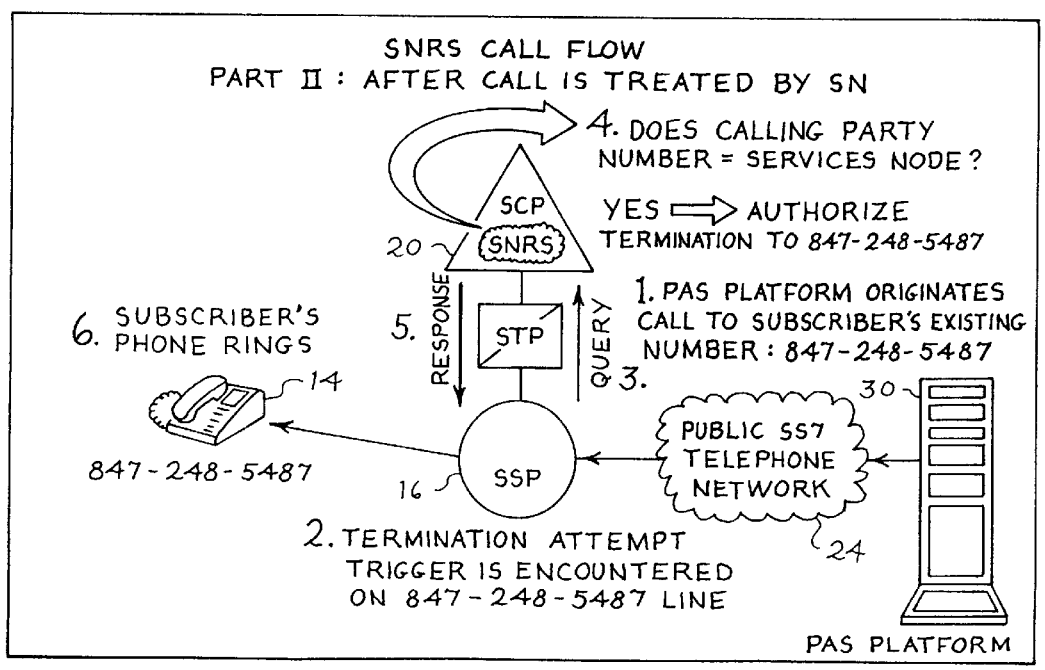

SERVICES NODE ROUTING SERVICE

This is a conyinuation of Ser. No. 08/997,081, filed Dec. 23, 1997, now U.S. Pat. No. 6,134,311.

BACKGROUND OF THE INVENTION

A. Field of the Invention

The present-invention relates to a method and device for routing and completing telephone calls. More particularly, the present invention relates to treating a telephone call at a Services Node prior to completing the call to the appropriate telephone number.

B. Description of the Related Art

A Personal Access Service ("PAS") allows a telephone subscriber to be reached at different locations by dialing a single telephone number that accesses the PAS system. PAS directs the telephone call to the appropriate telephone number where the called subscriber is likely to be reached according to a programmed criterion. For example, telephone calls to people who work in their business office during the morning but work from home during the afternoon can be routed to their office telephone during the morning hours and to their home telephone during the afternoon and evening hours.

U.S. Pat. No. 5,592,541 to Fleischer et al. describes the forwarding of incoming telephone calls defined by a routing list including alternate telephone numbers to which calls originally placed to the subscriber's number may be routed in an attempt to reach the subscriber. The routing list may forward all incoming calls to other telephone numbers or may forward only calls from selected groups of one or more telephone numbers. Incoming calls may be forwarded according to the time of the day, day of the week, a percentage allocation, a specific date or the originating location of the call.

U.S. Pat. No. 5,556,235 to Hetz describes an Integrated Services Control Point ("ISCP") of an Advanced Intelligent Network ("AIN") which routes telephone calls based on an internal criteria. The call routing criteria are maintained in a database and may be based on the time of the day or the telephone number was dialed.

Typically, PAS uses a computer system to store routing profiles specifying where telephone calls to PAS subscribers should be directed. Callers trying to reach PAS subscribers dial the PAS access telephone number associated with the subscriber they wish to reach. PAS determines the subscriber that the caller is trying to reach and where the call should be routed from the subscriber's routing profile. PAS then sends the call to the appropriate telephone number.

One problem with this PAS arrangement is the subscriber must maintain and callers must dial a separate telephone number to access the PAS system. The PAS access telephone number is a different telephone number than the subscribers' home or office telephone numbers where they are normally reached. Simply forwarding an existing telephone number, such as a subscriber's existing home or business telephone number, to PAS does not work. Callers attempting to reach subscribers at their existing home or office telephone numbers will be forwarded to the PAS system. However, when PAS determines that the call should be routed back to the subscribers' home or office, the telephone number is still set to forward the call to PAS. To address this problem, the office telephone number could be forwarded to PAS, but then a second line would have to be added to receive the telephone call from PAS. Thus, telephone subscribers must still maintain a separate telephone number to allow the callers trying to reach them to access the PAS system.

BRIEF DESCRIPTION OF THE DRAWINGS

The foregoing and other objects, features and advantages of the present invention will be more readily appreciated upon reference to the following disclosure when considered in conjunction with the accompanying drawings, in which:

FIGS. 2 and 3 show block diagrams of the system, of FIG. 1 processing a telephone call in accordance with the present invention.

DETAILED DESCRIPTION OF THE PREFERRED EMBODIMENT

The present invention provides a Services Node Routing Service ("SNRS") for treating telephone calls at a services node before completing the telephone call. The services node may provide a variety of services, such as a Personal Access Service ("PAS"), to treat the telephone call. The present embodiment allows PAS subscribers to use their home or office telephone numbers to access the PAS system without requiring that they maintain a separate PAS access telephone number. PAS subscribers are saved the cost of maintaining an additional PAS access telephone number, and callers are saved the inconvenience of having to call a special PAS access telephone number. In addition to PAS, the present invention can be used to treat telephone calls at services nodes providing other types of services.

Figure 1:
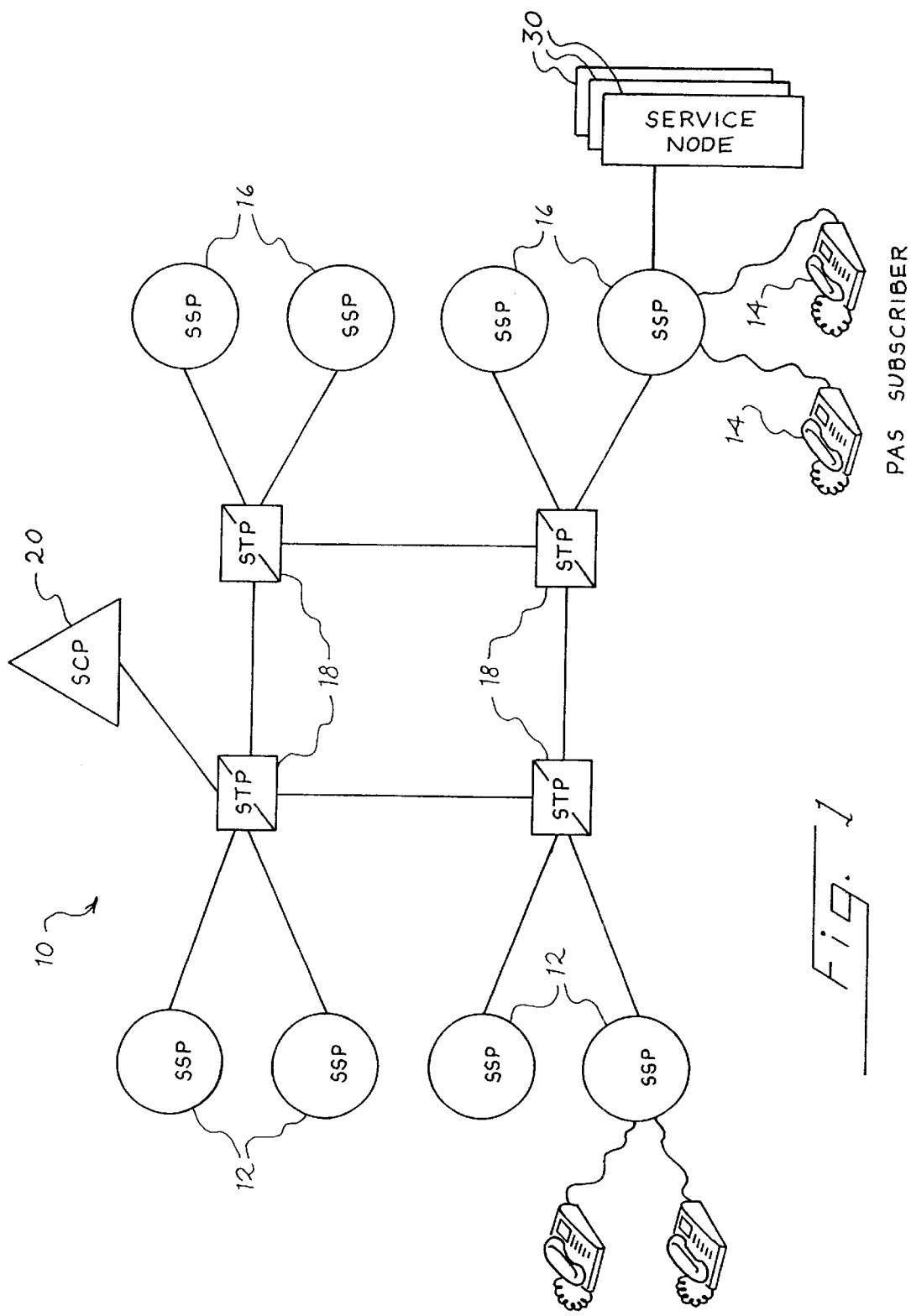
FIG. 1 is an overall system diagram of the circuit-switching network in accordance with the present invention.

FIG. 1 shows a block diagram of a circuit-switched network 10 including a plurality of conventional local end offices or originating offices 12 capable of implementing the present embodiment of the invention. For illustration purposes, only a limited number of originating offices 12 are shown. The originating offices 12 may be implemented with a conventional analog switch such as a 1AESS or mobile cellular telephone switch. Of course, the originating offices 12 may also be implemented with a Lucent 5ESS, Nortel DMS-100/200, or Siemens EWSD switch. Alternatively, originating calls may come from a trunk circuit from a long distance network. In the preferred embodiment, the circuit-switched network 10 uses a common channel signaling protocol to control the initiation, routing, and termination of telephone calls. Preferably, the network 10 operation is controlled by an out-of-band signaling system such as Signaling System 7 ("SS7"), known and widely used throughout the PSTN in North America. The terminating offices 16 may have Advanced Intelligent Network ("AIN") capability and may be referred to as a Service Switching Point ("SSP"). It should be understood, however, that the portion of the network 10 servicing the originating offices 12 may be a conventional network without AIN capability or a cellular telephone network.

A PAS subscriber 14 is provided telephone service by a SSP 16 with AIN capability. The exemplary embodiments described herein are described in connection with Advanced Intelligent Network Systems Generic Requirements: Switching Systems (GR-1298-CORE) and the Advanced Intelligent Network Generic Requirements: Switch-Service Control Point Adjunct Interface (GR-1299-CORE), which are fully incorporated by reference. AIN features allow the telephone network to control the routing of telephone calls based on a programmed criterion. Generally, in an AIN network the switches detect call processing events known as AIN "triggers". For ordinary telephone calls, no events trigger AIN processing and calls are handled without reference to a database for instructions. When an MN trigger is encountered, however, call processing is suspended and a query is made to a SCP 20 for instructions on how to handle the telephone call.

With AIN, the network controls the routing of telephone calls based on the originator or the recipient of the telephone call and the service logic within AIN network elements. The SSP 16 is a programmable circuit-switch equipped with AIN triggers to recognize AIN calls, launch queries to Service Control Points ("SCP") 20, and receive responses in the form of data and commands from the SCP 20 to process and route telephone calls. The SCP 20 may route the call according to different factors such as the time of the day, day of the week, the originating station type, the subscriptions of the calling or called party, the dialed telephone number, the originating telephone number, etc. The SSP 16 is in communication with the SCP 20 via a network of Signal Transfer Points ("STP") 18 implementing the AIM signaling network. The STPs 18 provide an out-of-band or common channel network to transmit signaling protocols between SSPs 16 and SCPs 20. Preferably, STPs 18 form a packet-switched network which routes messages from SSPs 16 to the SCPs 20 using Global Title Translations.

The SCP 20 contains service logic and data information about the network and its subscribers. The SCP 20 is preferably implemented with a microprocessor controlled computer system using computer peripherals controlled by application software implementing SS7 AIN functionality. The SCP 20 data information may be maintained in a computer database. SCP 20 typically includes service logic that operates on the data to determine how telephone calls are to be handled. Generally, the SCP 20 responds to queries from the SSPs 16 to determine the processing of telephone calls based on its service logic and data. The SCP 20 data that is maintained depends on the applications, the network, and its subscribers. In the present example, the SCP 20 data may include information about the various service nodes 30 such as the PAS platform(s) and the directory numbers associated with various services nodes 30. The data may include a trigger type, a Called Party Telephone Number (dialed telephone number), the subscriptions or services available to telephone subscribers, relationships between subscriber telephone number and terminating telephone numbers to the services node, and the originating telephone numbers of services nodes. For example, each subscriber telephone number may have a unique terminating telephone number at the PAS services node. The SCP 20 may include software and logic that associates Called Party Telephone Numbers with a terminating telephone number of the services node, and compares Calling Party Telephone Numbers to originating telephone directory numbers associated with the service nodes 30 as will be described in more detail below. STPs are available from telecommunications equipment vendors such as DSC and Nortel and SCPs are available from a number of telephone switch vendors such as Lucent Technologies and Erickson.

In the exemplary embodiment, the services node 30 includes a PAS system to connect callers to the appropriate telephone number where the called party 14 is most likely to be reached. The PAS services node 30 can determine the routing of the incoming calls based on a number of programmed criteria such as the time of the day, the day of the week, a personal schedule determined by the called party, the calling party, etc. The PAS system can be implemented in a variety of ways. Preferably, the PAS system uses a disk-based computer system with software and logic to determine how calls are to be routed. The PAS system can determine the Called Party Telephone Number from the unique terminating telephone number where the call comes into the PAS service node 30. For example, a routing profile contains the criteria to determine where calls to a Called Party Telephone Number are to be forwarded in order to reach the called party. The PAS services node 30 can then forward or initiate the call to the appropriate telephone number. The PAS system may also handle calls according to the calling party. Calls from certain callers may be forwarded to the appropriate telephone number or screened. PAS systems are available from a number of suppliers such as Comverse Technology Corp.

In the present embodiment, telephone lines associated with subscribers 14 using PAS are programmed with an AIN Termination Attempt Trigger ("TAT"). The telephone lines 14 using PAS may be the subscriber's office and/or home telephone lines. Incoming telephone calls to PAS subscribers encounter the AIN TAT. In response to the TAT, the SSP 16 providing service to the telephone number suspends the normal call processing of the incoming call and initiates a query to the SCP 20 to determine how the call is to be handled. The SCP 20 determines whether the call is to a Services Node Routing Service subscriber using the trigger type and the called telephone number. The SCP 20 service logic determines processing at a services node is necessary by associating the Called Party Telephone Number with the terminating telephone number of a services node. The SCP 20 responds by instructing the SSP 16 to send the call on to the services node 30 rather than completing the call to the Called Party Telephone Number. In this example, the SCP 20 sends the SSP 16 the terminating telephone number of the service node to forward the telephone call. The SCP 20 may determine whether and where to forward the telephone call according to the time of the day, day of the week, calling party, etc. The SSP 16 then connects the call to the services node 30 for treatment according to the response of the SCP 20. SS7 connectivity is required between the SSP 16 and the services node 30. The SSP 16 may connect calls to the services node 30 by a telephone line, trunk interface, Integrated Services Digital Network Primary Rate Interface, Integrated Services Digital Network Basic Rate Interface, Direct Inward Dial, etc. It should be understood that the SSP 16 may be connected to the services node 30 through a number of intermediate offices.

The services node 30 may provide a wide variety of treatments. A services node 30 can have a wide variety of voice and/or data interfaces. Preferably, the services node 30 has a computer program(s) and service logic to provide one or more voice/data services. Examples of services nodes functions are speech recognition, playing recorded announcements, DTMF tone recognition, and message storage and retrieval (voice and fax). Generally, services node 30 may treat the telephone call by simply playing the caller a pre-recorded message or it may route the call to another telephone number such as in the PAS system. Of course, the services node 30 may also apply a combination of different treatments. After treatment by the services node 30, the call is completed to the appropriate telephone number 14 which may be the same telephone number from which the call was forwarded to the services node. An attempt to complete the call to the subscriber's PAS access telephone number, however, encounters the TAT set on the telephone number. The TAT causes the SSP 16 to again suspend the call and query the SCP 20 for instructions on handling the call. In accordance with an aspect of the present invention, during this subsequent query to the SCP 20 it is recognized that the call has been previously treated by the services node 30 based on comparing the Calling Party Telephone Number to the originating telephone number of the services node(s). If the Calling Party Telephone Number is equal to the originating telephone number of the services node 30, the call is originating from the services node 30 and has already been treated. The SCP 20 instructs the SSP 16 to complete the call to the appropriate telephone number 14. If the Calling Party Telephone Number is unavailable, the SCP 20 service logic assumes that the telephone call has not yet been treated and the telephone call is forwarded to the services node.

Referring now to FIGS. 2 and 3, illustrated is an exemplary embodiment of a system utilizing the Services Node Routing Service in accordance with the present invention. The system includes a SSP 16 in communication with a plurality of STPs 18 and SCPs 20 to implement the AIN signaling network. The system also includes an AIN SS7 network 24 and the PAS platform 30. For illustration purposes, only one of a plurality of SSPs 16, STPs 18, SCPs 20 and services nodes 30 are shown.

As shown in FIG. 2, the originating caller 12 dials the subscriber's existing telephone number, in this example (555) 248-5487. In this exemplary embodiment, the telephone network 26 originating the telephone call need not have AIN capability, and may be a conventional analog network, cellular network, or a Personal Communication Service ("PCS"). The telephone network, such as the public switched telephone network ("PSTN"), processes the telephone call such that the SSP 16 providing service to the Called Party Telephone Number can connect the call to the called subscriber's telephone number. The SSP 16, however, has a TAT set on the Called Party Telephone Number that causes the SSP 16 to suspend processing of the telephone call and send a query the SCP 20. For example, the query may be a Termination_Attempt query from the SSP 16 to the SCP 20. Preferably, the query to the SCP 20 includes the Calling Party Telephone Number (the directory number of the telephone originating the call) and the Called Party Telephone Number. The query from the SSP 16 is connected to the SCP 20 through a network of STPs 18 as discussed in connection with FIG. 1.

Preferably, the SCP 20 data contains the terminating telephone numbers and originating telephone numbers of the various service nodes 30. The SCP 20 includes a computer system with service logic capable of accessing the data to associate Called Party Telephone Numbers with the terminating telephone numbers of the appropriate service nodes 30, and comparing Calling Party Telephone Numbers to the originating telephone numbers of service nodes 30. If the Called Party Telephone Number is associated with the terminating telephone number of a services node 30, calls to the telephone number are to be treated at that services node 30 terminating telephone number prior to being completed. The SCP 20 is also capable of comparing Calling Party Telephone Numbers with the originating telephone number of services nodes 30 to identify calls originating from services node 30. For example, if the Calling Party Telephone Number matches the originating telephone number of a services node, the telephone call has been originated from a services node. In FIG. 2, the Calling Party Telephone Number is the telephone number of the caller and does not match any of the originating telephone numbers of the services node 30. The SCP 20 therefore instructs the SSP 16 to forward the call to the services node 30 by sending the SSP 16 an AIN Forward_Call response containing the CalledPartyID, wherein the CalledPartyID is the terminating number for the subscriber of the services node. Alternatively, the SCP 20 may send a PrimaryTrunkGroup to the SSP 16 to route the call to the services node 30 over a trunk rather than a telephone line. The call is connected to the services node 30 which receives and processes the telephone call. The SCP 20 service logic may also include a switch such as a software flag or semaphore to disable/enable (Off/On) the routing of telephone calls to the services node 30.

Now referring to FIG. 3, the services node 30 is the PAS system that determines the routing of telephone calls according to programmed criteria as previously described. The PAS services node 30 determines where to route the telephone call according to a routing profile specifying where the called party is likely to be reached. The PAS services node 30 then initiates a call to connect the caller to the called party at the telephone number specified in the routing profile. In this example of the exemplary embodiment, the telephone number PAS uses to reach the subscriber is the same telephone number that the caller originally dialed to reach the subscriber, in this example (555) 248-5487. When the PAS services node 30 attempts to call this telephone number it also encounters the TAT which suspends the normal call processing and again sends a query to the SCP 20. This time, however, the SCP 20 recognizes the Calling Party Telephone Number to be an originating telephone number of the PAS services node 30. The call originating from the services node 30 indicates the telephone call has already been processed and treated. Accordingly, the SCP 20 instructs the SSP 16 to complete the call to the telephone number with an Authorize_Termination response.

Figure 4:
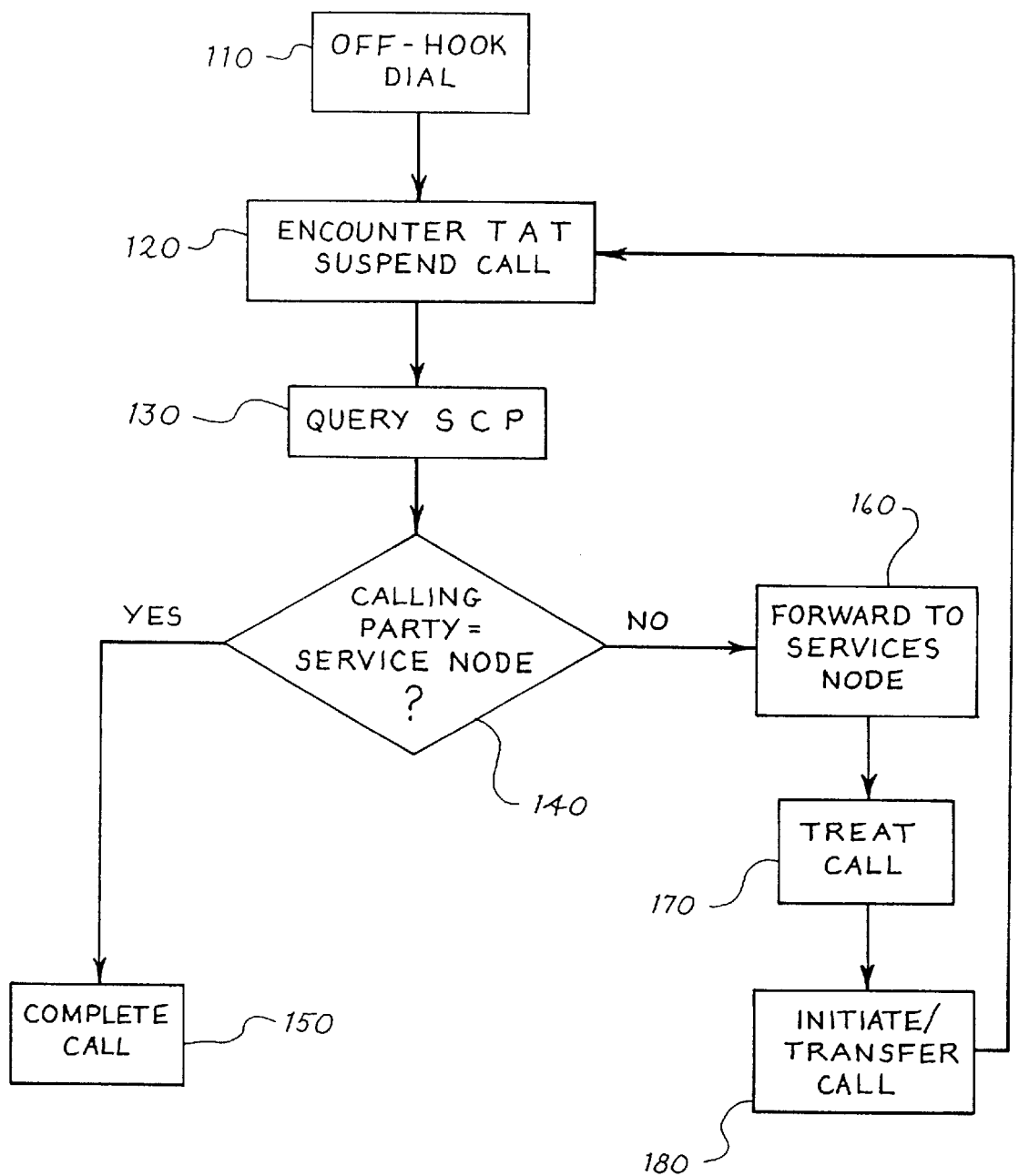
FIG. 4 shows a high-level flow chart showing the call processing of the system of FIG. 1.

Now referring to FIG. 4, in an exemplary embodiment of the Services Node Routing Service, a high-level logic flow diagram of the Services Node Routing Service processing a telephone call to a PAS system is described.

At step 110, the calling party goes off-hook and dials the digits of the telephone number of the PAS subscriber he is attempting to reach. The dialed telephone number may be the called party's business or home telephone number. In accordance with an aspect of the present invention, a separate PAS telephone number is not required. PAS subscribers may designate telephone calls to one of their telephone numbers, for example their office telephone number, to be directed to PAS for routing. The PAS subscriber's home or office telephone number can thus be called directly. Alternatively, a PAS subscriber may designate their office-and home telephone numbers to be handled by PAS. The SSP has a TAT set for each telephone number that the subscriber wishes to be routed using PAS. Alternatively, the trigger may include a 3/6/10 Digit Public Office Dialing Plan type trigger or Specific Digit String trigger.

At step 120, when the SSP 16 receives an incoming call to a subscriber's PAS designated telephone number(s) it encounters the TAT set on the telephone number associated with PAS. The TAT is an AIN event that causes the SSP to suspend normal processing of the call.

At step 130, the telephone call has been suspended and the SSP uses AIN to query the SCP 20 (FIG. 1) for instructions regarding the treatment of the telephone call. The SSP 16 query is routed to the SCP 20 over the STP 18 network carrying signaling traffic as shown in FIG. 1. Preferably, the query to the SCP 20 includes information such as the Called Party Telephone Number (the telephone number which was dialed by the caller) and the Calling Party Telephone Number associated with the party originating the telephone call. The Calling Party Number is typically either the telephone number of the caller that initiated the call or a telephone number associated with the services node completing the call.

At step 140, the SCP includes service logic to analyze the data and route telephone calls to services nodes. The data preferably includes Calling Party Telephone Numbers associated with the originating telephone numbers of services nodes. The SCP can thus identify telephone calls originating from a services node by comparing the Calling Party Telephone Number to the originating telephone numbers of the services nodes. In practice, the Calling Party Telephone Number may be the telephone number of the caller or the telephone number associated with a services node which is now completing the telephone call after treating it. If the Calling Party Telephone Number is equal to the originating telephone number of the services node, the telephone call is originating from the services node and can be completed. At step 150 the telephone call is completed. If the Calling Party Telephone Number is not equal to the telephone number assigned to the services node or is not available, the telephone call must be treated at the services node.

At step 160, if the telephone call did not originate from the services node, the telephone call is forwarded to the services node for processing or treatment. The services node may include a variety of different treatments for the telephone call. In this example, the services node is the PAS system with the appropriate instructions to route the call to the location where the called subscriber is most likely to be reached.

At step 170, the PAS system determines the telephone number where the PAS subscriber is likely to be reached using its routing profile and then completes the telephone call at step 180. In this example, the telephone number where PAS determines to complete the call is the same telephone number that was dialed to access PAS. Of course, PAS may forward the telephone call to another telephone number where the call may simply be completed.

At step 120, when PAS attempts to complete the telephone call to the PAS access telephone number it encounters the TAT again and the processing of the call is again suspended by the SSP to query the SCP at step 130. At step 140, the SCP service logic determines the originating party is equal to the services node, recognizing that the call is originating from the services node. Thus, the call has already been treated at the services node and should be completed to the telephone number rather than being forwarded again to the services node. The SCP instructs the SSP to complete the call at step 150.

In this manner, a PAS subscriber may use his office or home telephone numbers to access PAS without having to maintain a separate PAS access telephone number. Telephone calls to the home or office telephone number can then be redirected to PAS for routing instructions and completion to the appropriate telephone number.

In another embodiment of the invention, the services node may treat telephone calls by simply playing a message such as an informational message advising callers of important news or an advertisement to be played before the call is completed. After playing the message for the callers, the services node may complete the call to the desired telephone number in accordance with the method shown in FIG. 4. For example, callers to a supermarket may be played an announcement of the store hours or apprised of sale prices on products before being connected to the store operator. Alternatively, the services node may play callers a menu of different options to be selected. For example, a caller to a computer manufacturer may be instructed to dial "1" for the Sales Department and "2" for the Service Department. The services node may then route the call to the appropriate telephone number based on the caller's response.

It is to be understood that both the foregoing general description and the following detailed description are exemplary and explanatory and are intended to provide further explanation of the invention as claimed. Numerous modifications and variations are possible. The teachings herein are applicable to a cellular telephone system with AIN capability. For example, the steps of the flow diagrams may be taken in sequences other than those described and the invention may be practiced with more or fewer elements than those shown. It is intended that the foregoing detailed description be regarded as illustrative rather than limiting. It is the following claims, including all equivalents, which are intended to define the scope of this invention.

I claim:

1. A method of treating a telephone call prior to connecting the telephone call to a telephone number comprising the steps of:

querying a service control point regarding the treatment of the telephone call at a services node;

associating the telephone number with a services node;

forwarding the telephone call to the services node for treatment;

treating the telephone call at the services node; and completing the telephone call to the telephone number after treating the telephone call at the services node.

2. The method of claim 1 wherein the step of querying the service control point comprises the step of associating a Called Party Telephone Number with a terminating telephone number of the services node.

3. The method of claim 1 wherein the step of querying the service control point comprises the step of comparing a Calling Party Telephone Number with an originating telephone number of a services node to determine if the telephone call originated from the services node.

4. The method of claim 1 wherein the service control point is queried by a service switching point.

5. The method of claim 1 wherein the telephone call is completed if an originating telephone number of the telephone call comprises an originating telephone number of a services node.

6. The method of claim 1 wherein the step of treating the telephone call comprises identifying the telephone number where the telephone call will be completed by a personal access service.

7. The method of claim 6 wherein the telephone number to terminate the telephone call is determined based on the time of the day.

8. The method of claim 7 wherein the telephone number to terminate the telephone call is determined based on the day of the week.

9. The method of claim 1 wherein the treatment plays a message to callers.

10. The method of claim 9 wherein the message comprises a pre-recorded announcement played for callers.

11. The method of claim 10 wherein the message comprises a menu of choices for callers to select.

12. The method of claim 1 wherein the forwarding of the telephone call is based on the time of the day.

13. The method of claim 1 wherein the forwarding of the telephone call is based on the day of the week.

14. The method of claim 1 wherein the forwarding of the telephone call is based on the Calling Party Telephone Number.

15. The method of claim 1 wherein the forwarding of the telephone call is based on the station type of the calling party.

16. The method of claim 1 wherein the forwarding of the telephone call is conditioned on a switch to enable/disable forwarding.

17. A method for using a services node to route a call from a calling party, the method comprising:
 (a) with a service switching point, receiving a call from a calling party, the call being associated with a called party number;
 (b) sending a query from the service switching point to a service control point;
 (c) sending an identification of a services node from the service control point to the service switching point;
 (d) with the service switching point, connecting the call to the services node;
 (e) with the services node, determining a terminating number; and
 (f) routing the call to the terminating number.

18. The method of claim 17 wherein the services node is identified using the calling party's number.

19. The method of claim 17, wherein (d) is performed only if the call has not been previously treated by the services node.

20. The method of claim 17 further comprising determining whether the calling party is a subscriber to a services node routing service.

21. The method of claim 17 further comprising: with the services node, playing a message to the calling party.

22. The method of claim 17, wherein the terminating number is same number as the called party number.

23. The method of claim 17, wherein the terminating number is different from the called party number.

24. A system for routing a call from a calling party using a services node, the system comprising:
 a service switching point operative to receive a call from a calling party to a called party number;
 a services node coupled with the service switching point; and
 a service control coupled with the service switching point and operative to instruct the service switching point to route the call to the services node;
 wherein the services node is further operative to instruct the service switching point to route the call to a terminating number.

25. The system of claim 24, wherein the terminating number is same number as the called party number.

26. The system of claim 24, wherein the terminating number is different from the called party number.

27. The system of claim 24, wherein the service control point is further operative to instruct the service switching point to route the call to the services node only if the call has not been treated by the service node.

28. The method of claim 24, wherein the services node is further operative to play a message to the calling party.

* * * * *